United States Patent [19]

Dai

[11] Patent Number: 4,934,477
[45] Date of Patent: Jun. 19, 1990

[54] AUTOMATIC CONTROL DEVICE FOR PREVENTING REAR-END COLLISION OF MOTORIZED VEHICLES

[76] Inventor: Yeu J. Dai, 2Fl. No. 5, Lane 158, Sec. 2, Pao-Fu Road, Yungho, Taiwan

[21] Appl. No.: 241,509

[22] Filed: Sep. 7, 1988

[30] Foreign Application Priority Data

Aug. 18, 1988 [TW] Taiwan ............................. 77105701

[51] Int. Cl.⁵ ............................................. B60T 7/12
[52] U.S. Cl. ................................. 140/271; 180/169; 180/275; 180/277; 340/435; 340/436
[58] Field of Search ............... 180/271, 169, 275, 277; 340/52 B, 70, 53, 69, 552, 936, 425.5, 435, 436; 188/110; 303/93, 94; 246/187 C

[56] References Cited

U.S. PATENT DOCUMENTS

| | | | |
|---|---|---|---|
| 3,235,025 | 2/1966 | Quinn | 340/435 |
| 3,360,775 | 12/1967 | Schroeder | 340/436 |
| 3,750,100 | 7/1973 | Ueda | 340/436 |
| 3,946,360 | 3/1976 | Serritella | 340/436 |
| 4,371,050 | 2/1983 | Ikeura | 180/271 |
| 4,407,388 | 10/1983 | Steel | 180/275 |
| 4,574,908 | 3/1986 | Brick | 180/271 |
| 4,674,590 | 6/1987 | Krieg | 180/275 |
| 4,722,410 | 2/1988 | Melocik et al. | 180/275 |

Primary Examiner—Richard A. Bertsch

[57] ABSTRACT

This invention relates to an automatic control device adapted for preventing rear-end collision of a front motorized vehicle and a rear motorized vehicle running behind the front vehicle. The automatic control device for preventing rear-end collision according to this invention comprises: a microprocessor, a least one signal emitter, a speed detector, a least one signal receiver, a brake controller and an accelerator pedal controller, in which the at least one signal emitter is installed at the rear end of the front vehicle while the other comprising mechanisms are installed in the rear vehicle. The microprocessor couples separately with the signal emitter, the speed detector, the signal receiver, the brake controller and the accelerator pedal controller so as to transfer and process various signals. When the situation of overspeed is detected by the speed detector, the accelerator pedal controller and the brake controller will be actuated to reduce the fuel supply and apply the brake of the rear vehicle so as to prevent the occurrence of rear-end collisions.

10 Claims, 6 Drawing Sheets

AUTOMATIC CONTROL DEVICE FOR PREVENTING REAR-END COLLISION OF MOTORIZED VEHICLES

BACKGROUND OF THE INVENTION

This invention relates to an automatic control device adapted for preventing rear-end collision of motorized vehicles.

Rear-end collision accidents have gradually increased together with the increment in the number and running speed of motorized vehicles in the recent years. Most of this sort of traffic accidents occur due to the negligence of the drivers in failing to keep a safety distance between motorized vehicles running at high speeds.

SUMMARY OF THE INVENTION

In view of this, the primary object of this invention is to provide an automatic control device which can function, when a rear vehicle and a front vehicle are running at high speeds without maintaining a safety distance therebetween, to automatically apply the brake and reduce the fuel supply of the rear car so as to prevent the occurence of a rear-end collision.

Another object of this invention is to provide an automatic control device adapted for preventing the collision of a running car against an island or a dangerous bend.

The above-described objects can be achieved by an automatic control device for preventing rear-end collision according to this invention, comprising:

at least one signal emitter provided at the rear portion of said front motorized vehicle for emitting several signals each of which has a respective emitting frequency and a respective emitting distance;

at least one signal reciever provided at the front portion of said motorized vehicle capable of receiving signals of predetermined emitting frequencies emitted by said at least one signal emitter of said front vehicle and then transmitting a first signal;

a speed detector provided in said rear vehicle, adapted for detecting the running speed of said rear vehicle and transmitting a second signal;

a brake controller provided in said rear vehicle, adapted for applying the brake to said rear vehicle when a braking signal is received;

an accelerator pedal controller provided in said rear vehicle, adapted for controlling the motion of an accelerator pedal provided in said rear vehicle when an accelerator restriction signal is received so as to restrict the acceleration of the rear vehicle; and a microprocessor provided in said rear vehicle, adapted for receiving said second signal transmitted by said speed detector and presetting a receiving frequency for said signal receiver according to said second signal, and for transmitting a braking signal to said brake controller and an accelerator restriction signal to said accelerator pedal controller when said first signal transferred by said at least one signal receiver is received.

BRIEF DESCRIPTION OF THE INVENTION

This invention will be more fully understood from the following detailed description with respect to a preferred embodiment thereof, taken in connection with the accompanying drawings.

Figure 9:
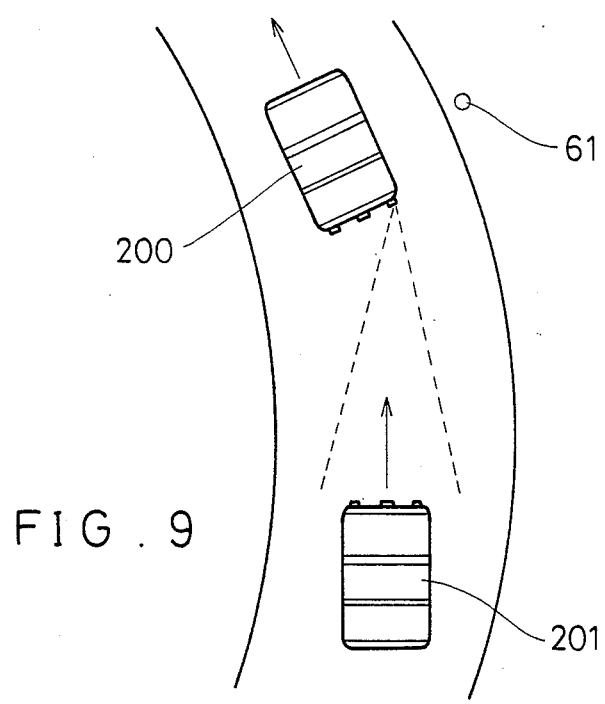
Figure 10:
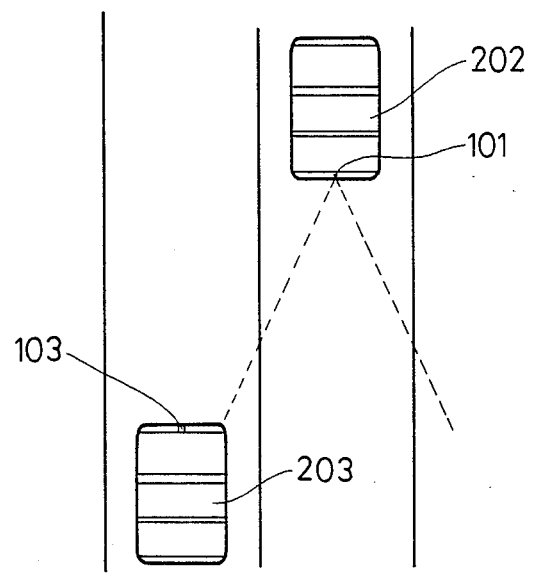

FIG. 9 is a schematic top view showing how the device of this invention work when two cars, provided with the automatic control device for preventing rear-end collision in accordance with this invention, are running in a bend; and FIG. 10 is a schematic top view showing how the device of this invention work when two cars, provided with the automatic control device for preventing rear-end collision in accordance with this invention, are running in adjacent lanes.

Figure 1:
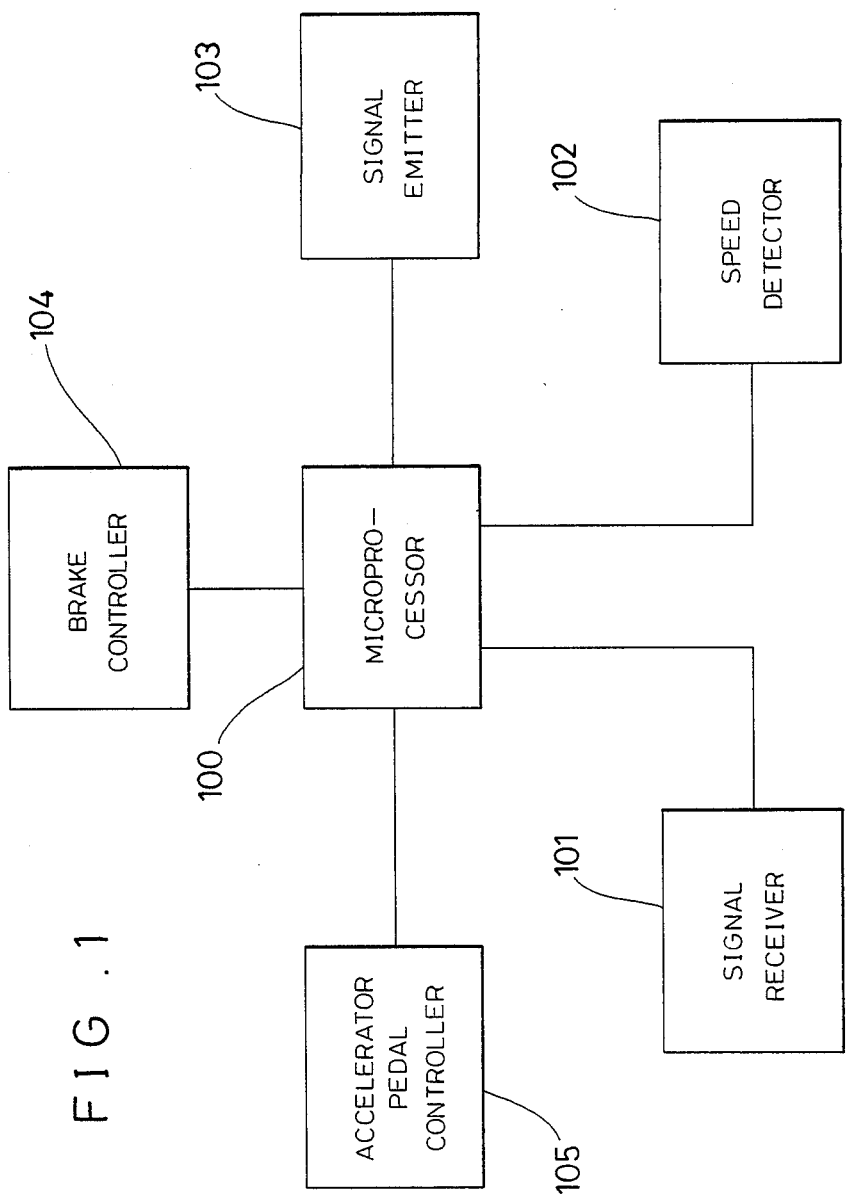
FIG. 1 is a block diagram schematically showing the comprising units of the automatic control device for preventing rear-end collision of cars in accordance with this invention.

As can be understood from FIG. 1, the automatic control device for preventing rear-end collision according to this invention comprises: a microprocessor 100, a plurality of signal emitter 101, a speed detector 102, a plurality of signal receiver 103, a brake controller 104 and an accelerator pedal controller 105. The microprocessor 100 couples separately with the signal emitter 101, the speed detector 102, the signal receiver 103, the brake controller 104 and the accelerator pedal controller 105 so as to transfer and process various signals.

Figure 3:
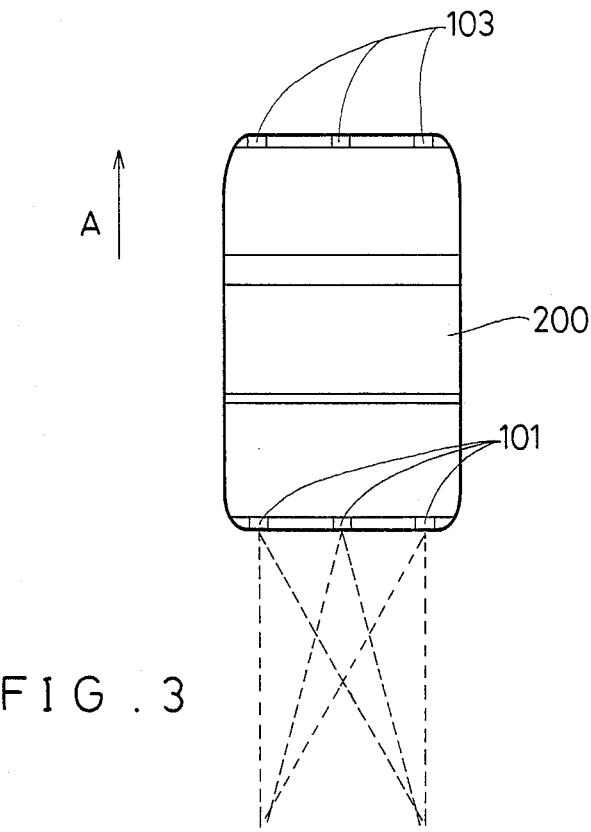
FIG. 3 is a schematic top view showing the emitting directions of the signal emitters in the device of this invention.
Figure 5:
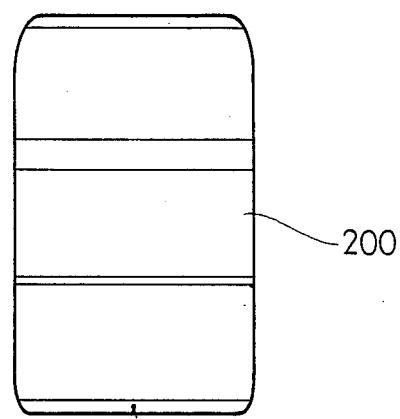
FIG. 5 is a schematic top view showing the emitting distance and angular range of each signal emitted by the signal emitter in the device of this invention.
Figure 6:
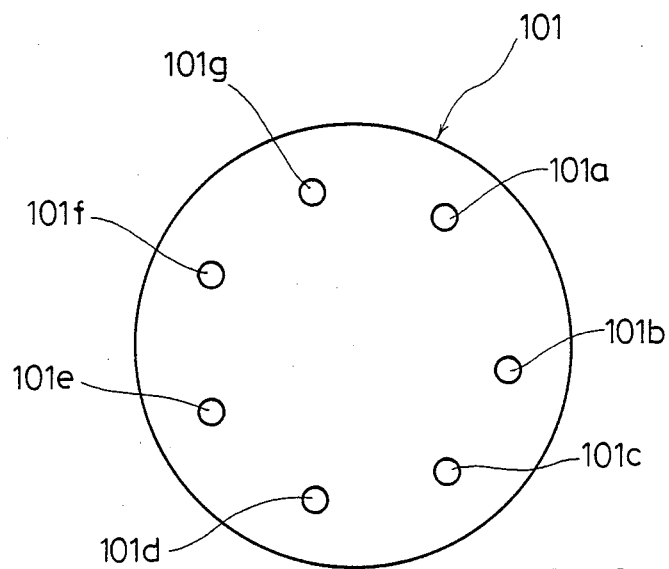
FIG. 6 is a scematic front view of a signal emitter in the device according to this invention.

As shown in FIG. 3, according to a preferred embodiment of this invention, three signal receivers 103 are installed at the front portion of a car 200, running along the direction of arrow A, provided with the automatic control device for preventing rear-end collision in accordance with this invention. Each signal receiver 103 includes an elongated housing with its longitudinal direction being parallel to the running direction of the car, and is provided therein with seven signal receiving units 103a, 103b, 103c–103g arranged along its longitudinal direction (see also FIG. 4). The front end of the elogated housing of the signal receiver 103 is open so that the receiving units may receive signals coming from the open front end of the elongated housing. In addition, three signal emitters 101 are installed at the rear portion of the car 200. As schematically shown in FIG. 6, each signal emitter 101 includes seven emitting units 101a, 101b, 101c–101g, each of which has a emitting frequency and an emitting distance different from those of other emitting units. Consequently, seven receiving zones I, II, III—(referring to FIG. 5) are formed behind the car 200. When another car running behind the car 200 enters the respective receiving zone, the signal emitted by the signal emitter 101 of the front car 200 will be received by the receiver 103 of the rear car and, if the frequency of the received signal is identical to the preset frequency, the microprocessor 100 provided in the rear car will actuate an alarm system (not shown) to send out an alarm signal and meanwhile send out commands to restrict the acceleration of and to apply a brake to the rear car as to be described in more detail later.

As can be seen from FIG. 3, the emitting directions of the signal emitters 101 disposed near the rear left and rear right corners of the car slant slightly to the longitudinal center line of the car so as to make sure that signals emitted by a front car 200 running in a bend (see FIG. 9) may be correctly transferred to a rear car 201. Furthermore, when a car is turning to the right or left or is applying the brake, the signal emitters located at the two outermost positions may swivel to the left or right by 30 degrees so as to more reliably prevent rear-end collision.

Figure 2:
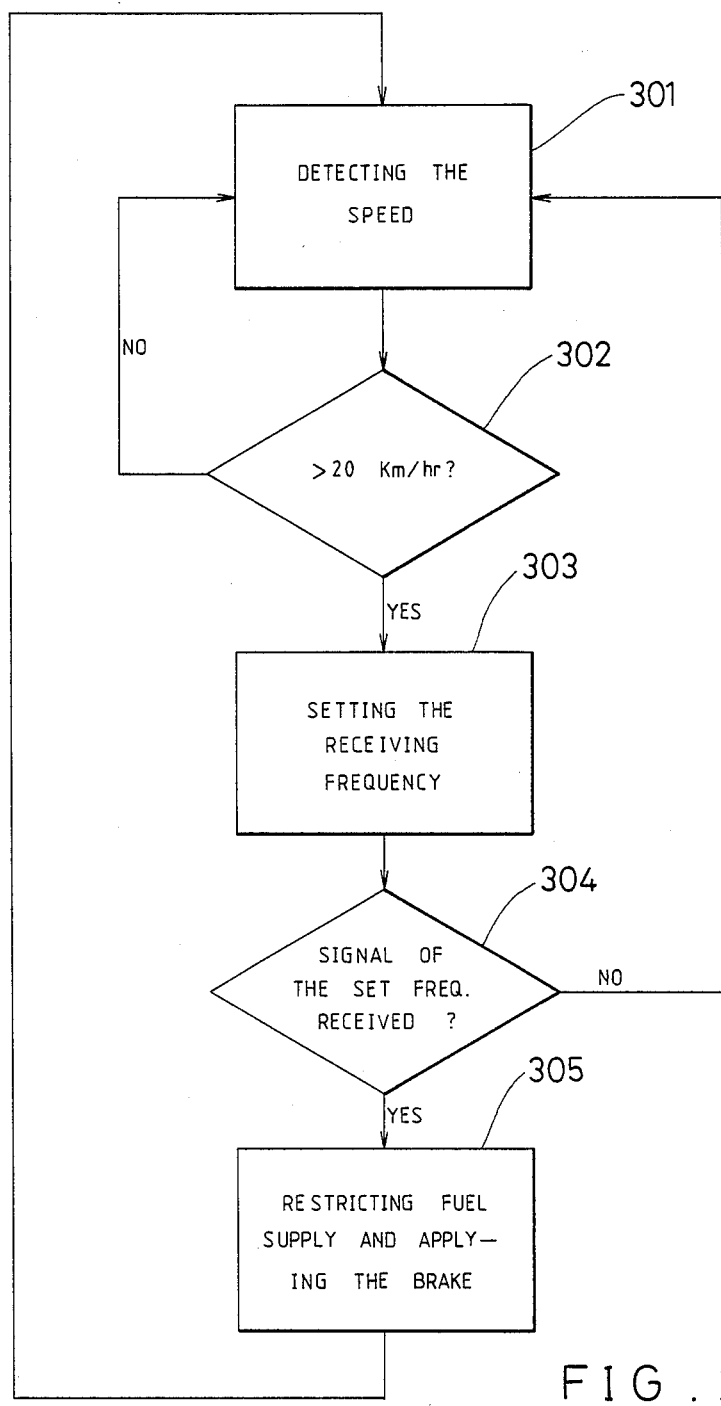
FIG. 2 is a flow chart showing the way of controlling the running speed of cars by means of the microprocessor in the device of this invention.

The operation of the automatic control device for preventing rear-end collision in accordance with this invention will now be described. Referring to FIG. 2, the automatic control device of this invention is automatically actuated when the car is started. At this time, the microprocessor 100 will send out a command making the speed dectector 102 to begin the detection of the running speed of the car (step 301) and the speed detector 102 will send back to the microprocessor 100 a second signal of the detected speed. If the detected speed is under, say, 20 Km/hr, neither the brake controller nor the accelerator pedal controller is actuated. On the contrary, if the detected speed is over 20 Km/hr (step 302), the receiving frequency of the signal receivers 103 is preset according to the detected running speed (step 303). There is a definite relationship between the preset frequency and the frequency of the signals emitted by the signal emitter 101. Namely, we can classify the running speed of the car over 20 Km/hr into seven classes each of which corresponds, respectively, to one of the seven frequencies of the distance signals emitted by the signal emitters (of a front car). When the running speed is in the range of the highest class, the receiving frequency of the signal receiver is preset to be the frequency of one of the emitted signals which has the longest emitting distance. On the other hand, when the running speed is within the range of the second highest class, the receiving frequency of the signal receiver is preset to be the frequency of an emitted signal which has the second longest emitting distance. Besides, each of the above-described seven emitting distances of the emitted signals corresponds, respectively, to a safety distance which should be maintained when a car is running at each class of running speed. Accordingly, when a rear car is running at a speed without properly keeping a safety distance, corresponding to its running speed, with a front car, the signal receivers of the rear car will receive a distance signal, emitted by the front car, having an emitting frequency equal to the receiving frequency preset by the microprocessor of the rear car. Namely, the rear car has entered the emitting distance of a signal having a frequency corresponding to the running speed of the rear car. Consequently, upon receipt of a first signal showing that a signal of preset frequency has been received by the signal receiver 103 (step 304), the microprocessor 100 immediately functions to restrict the fuel supply (acceleration) and to apply the brake through the operation of the accelerator pedal controller and the brake controller (step 305).

Figure 7:
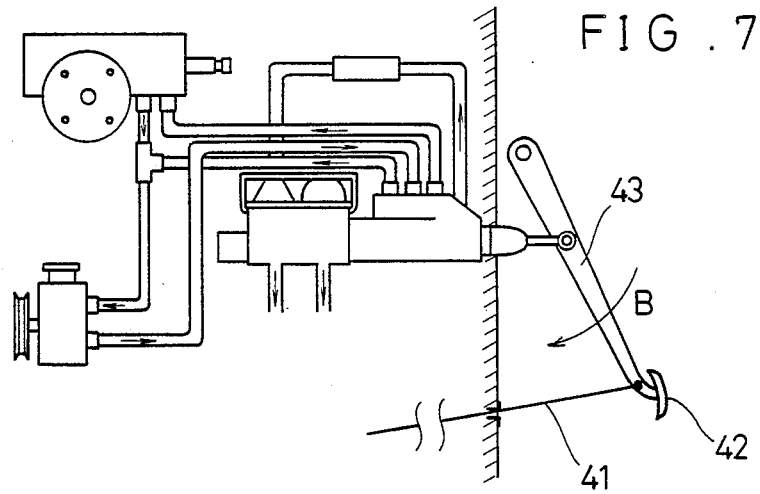
FIG. 7 is a view showing how the brake controller in the device of this invention function to control the brake when the condition of overspeed is detected.
Figure 8:
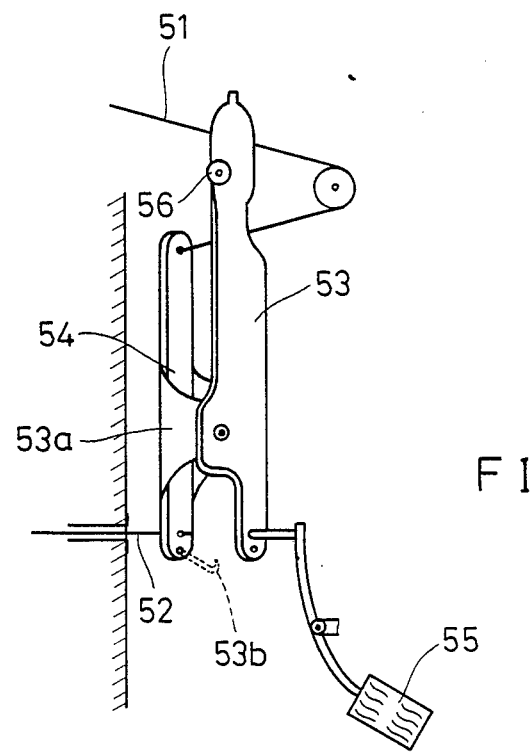
FIG. 8 is a view showing how the accelerator pedal controller in the device of this invention function to control the accelerator pedal so as to restrict acceleration of the rear car.

One example of the operation of restricting the fuel supply and applying the brake is described as follows with reference to FIGS. 7 and 8. When a signal having a frequency preset by the microprocessor is received by the signal receivers, some driving mechanism such as motors (not shown) in the brake controller and in the accelerator pedal controller will be actuated to, respectively, pull a cable 41 and 51. When the cable 41 is pulled toward the left hand side of FIG. 7, a braking lever 43 is swivelled along the direction of an arrow B and, meanwhile, the braking pedal 42 is moved leftward resulting a braking action. On the other hand, when the cable 51 is pulled toward the left hand side of FIG. 8, the cable 51 will pull the clamping bar 53a of a clamp 53 against a spring 54 installed in the clamp 53 so as to make the clamping bar 53a swivel along the direction of arrow C to loosen an acceleration control cable 52. (The pivot center of the clamp 53 is designated as 56). Under this situation, even if the pedal 55 is pressed downward, the acceleration control cable 52 cannot be tightened and thus acceleration of the car is impossible.

As described above, when it is detected that a predetermined safety distance corresponding to the running speed is not maintained, the brake controller and the acceleration pedal controller will automatically be actuated to restrict the fuel supply and meanwhile to apply the brake to a rear car so as to prevent the occurence of rear-end collisions among the running cars.

Figure 4:
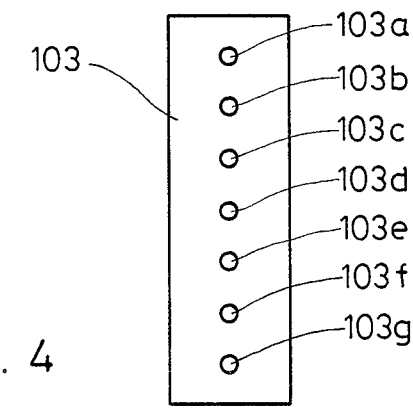
FIG. 4 is a view showing the arrangement of several signal receiving units in a signal receiver in the device of this invention.

As shown in FIG. 4, the receiving units 103a, 103b, 103c, --- and 103g of the signal receiver 103 are arranged along the running direction of the car in accordance with the order of the emitting distances of the signals to be received thereby. Namely, the receiving unit 103g adapted for receiving a signal having a longest emitting distance is disposed at the rear end position of the receiver 103 and the receiving unit 103a for receiving a signal having a shortest emitting distance is disposed at the front end position of the receiver 103. Consequently, thanks to the shield of the side wall of the receiver 103, signals having longer emitting distances emitted from a front car 202 running in the adjacent lane (see FIG. 10) can not reach those receiving units adapted for receiving signals having longer emitting distances such as the receiving unit 103g, and thus interference from cars 202 running in the adjacent lanes can be avoided.

The signal emitters in the device of this invention, such as that designated by 61 in FIG. 9, can also be carried by walkers (i.e., pedestrians) or attached to stationary traffic facilities such as curbing, signs, traffic lights and the like located adjacent the roadway, for example, at intersections, dangerous curves, or upon traffic islands --; and, so as to further assure the safety of running cars.

Besides, a hook-like member 53b can also be attached to the clamp 53, which can be hooked at the free end of the clamp 53 so as to maintain the formal function of the accelerator pedal when the accelerator pedal controller is out of order.

Alternatively, we can design the microprocessor 100 so that a car running at a speed under 20 Km/hr may be applied a slight brake or a heavy brake when the distance between it and another front car approaches 2 meters or 1 meter, respectively.

Despite of the fact that this invention has been described in detail by taking the car as an example, it is applicable to any kinds of motorized vehicles.

While this invention has been described in connection with an embodiment, it is to be understood that this invention is not be limited to the disclosed embodiment but, on the contrary, is intended to cover various modifications and equivalent arrangements included within the spirit and scope of the appended claims which scope is to be accorded the broadest interpretation so as to encompass all such modifications and equivalent structures.

I claim:

1. An automatic control device for preventing rear-end collision of a front motorized vehicle and a rear motorized vehicle running behind said front vehicle, comprising:

at least one signal emitter provided at the rear portion of said front motorized vehicle for emitting several signals each of which has a respective emitting frequency and a respective emitting distance, said signals defining a corresponding number of concentric receiving zones behind said front motorized vehicle;

at least one signal receiver provided at the front of said rear motorized vehicle capable of receiving signals of the preset emitting frequencies emitted by said at least one signal emitter on said front vehicle and then transmitting at least a first signal in response to the receipt of a preset one of said several signals;

a speed detector provided in said rear vehicle, adapted for continuously detecting the running speed of said rear vehicle and transmitting a second signal indicative of the detected speed;

a brake controller provided in said rear vehicle, adapted for applying a brake to said rear vehicle when a braking signal is received;

an accelerator pedal controller provided in said rear vehicle, adapted for restricting the motion of an accelerator control cable in response to movements of an accelerator pedal provided in said rear vehicle when an accelerator restriction signal is received; and, a microprocessor provided in said rear vehicle, adapted for receiving said second signal transmitted by said speed detector and presetting a receiving frequency of said signal receiver according to said second signal, and also adapted for receiving said first signal and transmitting a braking signal to said brake controller and an acceleration restriction signal to said accelerator pedal controller when a signal having said preset frequency is received by said signal receiver.

2. An automatic control device as described in claim 1, wherein at least one of said motorized vehicles is an automobile.

3. An automatic control device as described in claim 1, wherein at least one of said motorized vehicles is a motor cycle.

4. An automatic control device as described in claim 1, further comprising signal emitters installed at stationary locations adjacent to the normal travel paths of said motorized vehicles.

5. An automatic control device as described in claim 1, further comprising a set of signal emitters carried by pedestrians.

6. An automatic control device as described in claim 1, wherein said signal receiver includes shielding means adapted to prevent the receipt of signals emitted by a signal emitter located other than in front of said rear vehicle.

7. An automatic control device as described in claim 1, wherein there are three signal emitters located in spaced relation across the rear of said front vehicle.

8. The control device as described in claim 7, wherein the outer signal emitters are slanted inwardly towards the longitudinal center line of the front vehicle.

9. The control device described in claim 1, wherein seven separate signals each having a distinctive frequency and emitting distance are emitted by said signal emitter, said seven signals defining seven concentric receiving zones behind said front motorized vehicle.

10. The control device described in claim 1, wherein said microprocessor transmits a braking signal and an accelerator restriction signal when a signal having said preset frequency is received by said signal receiver only when said second signal indicates that the vehicle speed exceeds a preset minimum.

* * * * *